United States Patent [19]

Carty

[11] Patent Number: 4,929,018
[45] Date of Patent: May 29, 1990

[54] TRUCK RAMP STORAGE ARRANGEMENT
[75] Inventor: William E. Carty, Tempe, Ariz.
[73] Assignee: U-Haul International, Phoenix, Ariz.
[21] Appl. No.: 214,516
[22] Filed: Jul. 1, 1988
[51] Int. Cl.⁵ ............................................. B62D 27/02
[52] U.S. Cl. .................................... 296/204; 296/37.6; 280/783; 280/796; 280/800
[58] Field of Search .......... 296/26, 37.6, 204; 280/783, 796, 800; 414/537; 14/71.1

[56] References Cited

U.S. PATENT DOCUMENTS

| | | | |
|---|---|---|---|
| 3,511,393 | 5/1970 | Abromavage et al. | 14/71.1 X |
| 3,559,826 | 2/1971 | Abromauge | 414/537 |
| 3,580,611 | 5/1971 | McNitt | 280/800 X |
| 3,713,662 | 1/1973 | Abromavage | 296/37.1 X |
| 4,198,187 | 4/1980 | Mountz | 296/204 X |

FOREIGN PATENT DOCUMENTS 0921929  4/1982  U.S.S.R. ............................ 296/204

Primary Examiner—Dennis H. Pedder
Attorney, Agent, or Firm—Cahill, Sutton & Thomas

[57] ABSTRACT

A truck chassis frame is constructed to provide storage space for a loading ramp between the longitudinal frame members. A transverse frame member positioned beneath the longitudinal frame members is connected to the longitudinal frame members by brackets secured to end regions of the transverse member and to the outer face of the C-shaped longitudinal members. The space above the transverse member including the open regions of said longitudinal members is open to provide the storage space.

9 Claims, 1 Drawing Sheet

U.S. Patent        May 29, 1990        4,929,018
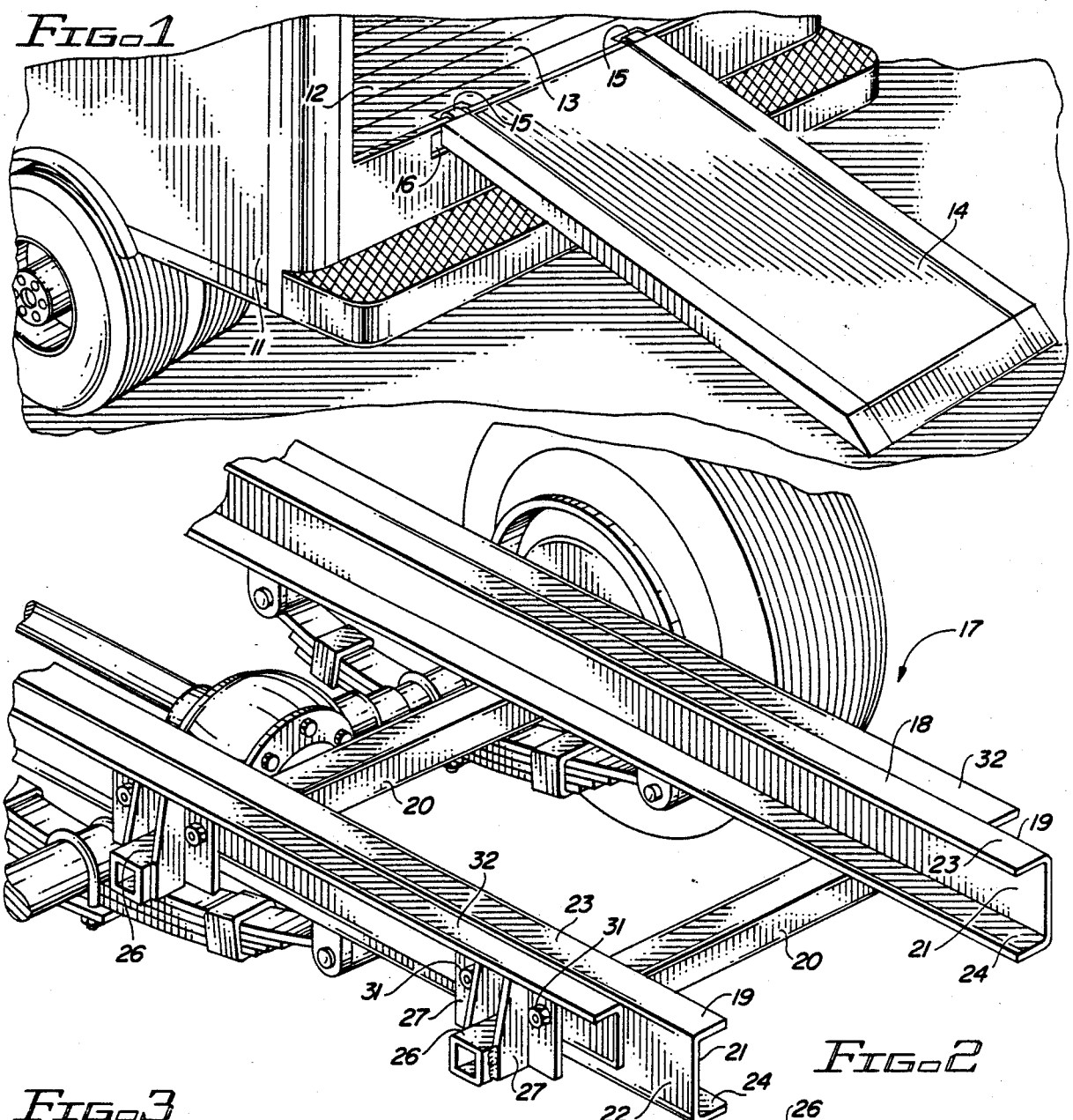
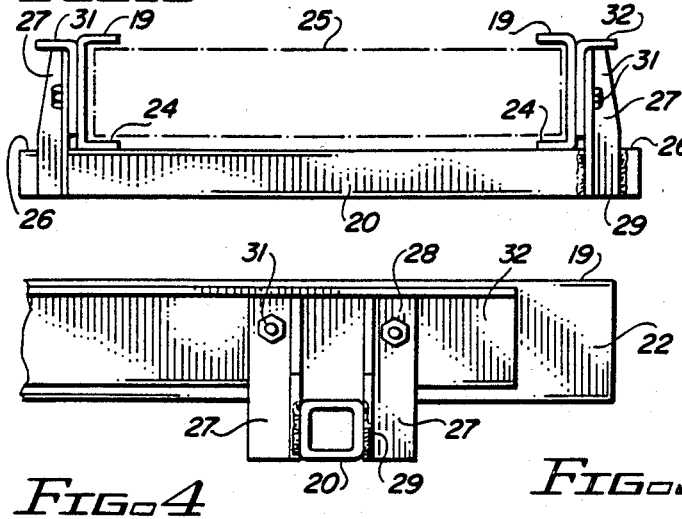
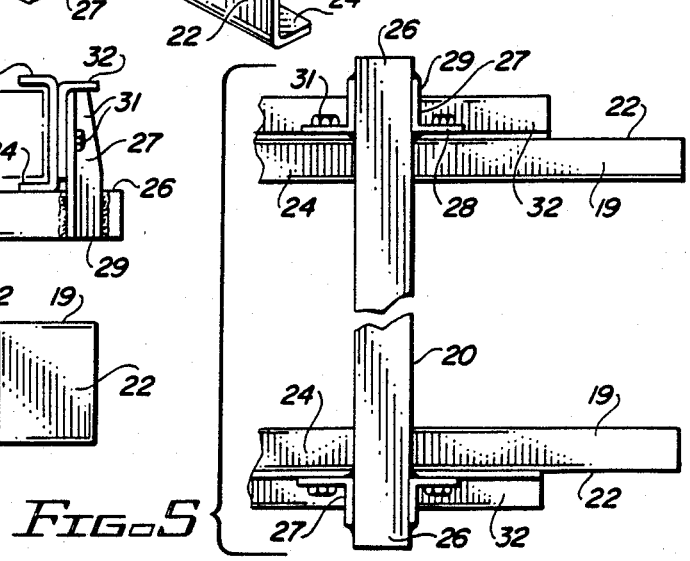

TRUCK RAMP STORAGE ARRANGEMENT

TECHNICAL FIELD

This invention is concerned with improving the capability of a truck to store a ramp intended for use in loading and unloading the truck.

BACKGROUND ART

It has been common practice for sometime in the truck rental industry to supply a ramp with the truck to facilitate loading and unloading the truck. A significant advance was made in this art when inventors recognized the possibility of providing a storage space for the ramp between the longitudinal frame members of the truck chassis.

Storage of the ramp in the frame of the truck offers several advantages. Such storage is outside the body of the truck and therefore does not occupy valuable cargo space nor interfere with articles stored in the truck body. Secondly, this storage arrangement does not increase the height of the truck as some prior storage arrangements did. And, further, this storage arrangement positions the ramp at the rear of the truck immediately beneath the floor of the truck body where it is accessible to the user who merely needs to withdraw the ramp from its storage space and place it in use.

Representative prior art arrangements for frame storage of ramps are disclosed in a series of three United States patents granted to John C. Abromavage and Henry S. Shattles, namely: U.S. Pat. No. 3,511,393, granted May 12, 1970 for "RAMP ASSEMBLY"; U.S. Pat. No. 3,559,826, granted Feb. 2, 1971 for "AUTOMOTIVE CHASSIS"; and U.S. Pat. No. 3,713,662, granted Jan. 30, 1973 for "CHASSIS WITH STORAGE SPACE".

The principal shortcoming of the storage arrangements of the Abromavage et al patents lies in the design of the transverse members employed to connect the longitudinal frame members. The transverse frame members of these patents, although designed to accommodate a ramp, have substantial structure within the space between the longitudinal frame members which significantly limits the size of the ramp that can be stored.

Ramp width is of considerable importance because the wider the ramp the more easily it can be navigated by persons loading and unloading the truck. And depth is also important because a thicker ramp can be a stronger ramp.

There continues to be a need, therefore, for a ramp storage arrangement in the frame of a truck that will maximize the size of the ramp which can be stored therein.

DISCLOSURE OF THE INVENTION

This invention contemplates the provision of one or more transverse frame members which connect the longitudinal frame members in a manner to leave the entire space between the C-shaped longitudinal members, including the facing open regions of the longitudinal members, open and free of any obstruction. In this manner the entire width and height of the space between the longitudinal frame members can be utilized as storage space for the ramp.

The transverse frame members are positioned beneath the longitudinal frame members and have end regions that extend beyond the transverse extent of the longitudinal members. Bracket means are secured to the outer faces of each of the longitudinal members, extend downwardly from the longitudinal members, and are secured to the end regions of the transverse members. Thus, there are no structural members in the space between the longitudinal frame members.

BRIEF DESCRIPTION OF THE DRAWING

The invention is described in greater detail hereinafter by reference to the accompanying drawing wherein:

FIG. 1 is a fragmentary, three-quarter, rear perspective view of a truck body with a loading ramp deployed therefrom;

FIG. 2 is a fragmentary, three-quarter, rear perspective view of a truck chassis constructed in accordance with the present invention;

FIG. 3 is an elevational view of the frame of the truck as seen from the rear;

FIG. 4 is an elevational view of the portion of the frame of FIG. 3 as seen from the side; and FIG. 5 is a bottom view of the portion of the frame shown in FIG. 4.

BEST MODE FOR CARRYING OUT THE INVENTION

In FIG. 1 the truck body is designated generally by reference numeral 11 and has a cargo space 12 with a floor 13. Rental industry trucks generally have enclosed bodies 11 and are used by do-it-yourself renters or transporters, often for moving personal belongings. It is customary in this industry to provide the truck with a ramp 14 to facilitate loading and unloading the cargo space 12.

The ramp 14 will normally be provided with some means for attaching its forward end to the truck body 11 at approximately the level of the cargo space floor 13. In the ramp illustrated in FIG. 1 this attaching means includes a pair of hooks 15 adapted to engage an upstanding portion of the truck body 11. The rear end of ramp 14 simply rests on the ground. The ramp 14 is utilized, of course, by persons loading and unloading the truck to either carry articles up and down the ramp or to move those articles up and down the ramp on a dolly or other wheeled vehicle. To reduce the strain to persons loading and unloading the truck ramp 14 should have a minimum incline. In other words, the floor 13 of cargo space 12 should be as low as possible in relation to the ground. In addition, the wider the ramp 14 the easier and safer it is for persons to navigate the ramp in loading and unloading the truck body 11.

When not in use the ramp 14 should be stowed in the truck body 11 for transport, but preferably not within the cargo space 12 as that would reduce available cargo space.

As mentioned previously, other inventors have proposed that a storage space for the ramp 14 be provided beneath the cargo space floor 13 within the frame of the truck chassis. This invention utilizes and provides an improvement upon that storage concept.

For storage of ramp 14 the rear wall of the truck body 11 is provided with an opening 16. Opening 16 provides access to a ramp storage area provided by a specially constructed frame portion of the truck chassis which is illustrated in FIGS. 2 through 5.

The truck chassis, a portion of which is illustrated in FIG. 2, is designated generally by reference numeral 17. As is customary in truck construction, the chassis includes a frame 18 which, in turn, includes a pair of longitudinal frame members 19 and several transverse frame members 20.

Longitudinal frame members 19 are conventional in construction, each consisting of a C-shaped metal channel. Each longitudinal member 19 has an upright web 21 with an outer face 22 and inwardly extending top and bottom flanges 23 and 24, respectively The construction and disposition of longitudinal frame members 19 is such that their C-shaped sections have open regions facing each other. The principal objective of this invention is to permit the entire space between the two longitudinal frame members 19, including the open regions of their C-shaped sections between the top and bottom flanges 23 and 24, to be utilized for storage of the ramp 14. This permits a wider ramp 14 to be stored in the truck frame 18 than was heretofore possible.

This enlarged storage space, which is indicated by dot and dash lines 25 in FIG. 3, is made possible by an improved construction and disposition of the transverse frame members 20. Each transverse frame member 20 is preferably formed of a metal tube having a rectangular cross-section (see FIGS. 2 and 4) for maximum strength and rigidity. Each transverse frame member 20 is positioned beneath the longitudinal frame members 19 in contact with the lower surface of the bottom flanges 24 of the longitudinal members.

As shown in FIGS. 2, 3 and 5, each transverse frame member 20 has a region 26 at each end thereof extending outwardly of and beyond the transverse extent of the longitudinal frame members 19. These end regions 26 of the transverse frame members 20 are utilized to secure the transverse frame members 20 to the longitudinal frame members 19 outside the space between the longitudinal frame members.

The attachment and securing means for this purpose preferably comprises bracket means comprising a pair of angle brackets 27 for each end region 26 of each transverse frame member 20. Each angle bracket 27 has a longitudinal portion 28 which is attached to the outer face 22 of a longitudinal frame member 19 and also has a transverse portion 29 which is attached to its respective transverse frame member 20. A variety of attachment mechanisms can be used for this purpose. For example, the longitudinal portions 28 of the angle brackets 27 can be attached to the longitudinal frame members by means of stud bolts and nuts 31 carried by and projecting outwardly from the longitudinal frame members. It is important that this attachment means provide no significant protuberances within the open regions of the longitudinal frame members. And the transverse portions 29 of the angle brackets 27 can be welded to the end regions 26 of transverse frame members 20.

Additional strength and rigidity can be incorporated into the frame 18 by providing longitudinal reinforcing members 32 sandwiched between the outer faces 22 of longitudinal frame members 19 and the angle brackets 27. The longitudinal reinforcing members 32 are preferably made of metal and have an angled cross-section. Each reinforcing member 32 has a vertical portion adjacent its respective longitudinal frame member and a horizontal portion extending outwardly from its respective longitudinal frame member.

With the assemblage of longitudinal frame members 19, transverse frame members 20, angle brackets 27 and longitudinal reinforcing members 32 there is provided a frame structure 18 possessing all the strength and rigidity of prior frame structures but which leaves open the region between the longitudinal frame members 19 to provide the storage space 25 for the ramp 14. It is thus possible to store a wider ramp 14 within the frame 18 than was possible with prior frame constructions.

It is further to be noted that there is no structure added to the frame 18 above the longitudinal frame members 19. Thus, the cargo space floor 13 of the truck body 11 can rest directly on the top flanges 23 of the longitudinal frame members 19. This gives the added benefit of not requiring any increase in height of the cargo space floor 13 above the ground to provide the improved ramp storage space within the frame 18.

What is claimed is:

1. In a truck chassis, a pair of longitudinal frame members, said longitudinal frame members being characterized by having C-shaped cross-sections providing closed outer faces and having open regions facing each other, a transverse frame member positioned beneath said longitudinal members and having end regions extending beyond the transverse extent of said longitudinal members, and bracket means secured to the outer face of each of said longitudinal members and extending downwardly from said longitudinal members, said bracket means being secured to the end regions of said transverse member, the arrangement being such that the space above said transverse member and between said longitudinal members including the open regions of said longitudinal members is open to provide a storage space.

2. The truck chassis of claim 1 further characterized in that said transverse frame member is a tubular member.

3. The truck chassis of claim 1 further comprising a longitudinal reinforcing member positioned between each longitudinal frame member and said bracket means on the outer face of the longitudinal member, each reinforcing member having a vertical portion adjacent its respective longitudinal frame member and a horizontal portion extending outwardly from its respective longitudinal frame member.

4. The truck chassis of claim 3 further characterized in that said transverse frame member is a tubular member.

5. The truck chassis of claim 1 further characterized in that each of said bracket means comprises an angle member having a longitudinal portion secured to its respective longitudinal frame member and a transverse portion secured to the transverse frame member.

6. The truck chassis of claim 3 further characterized in that each of said bracket means comprises an angle member having a longitudinal portion secured to its respective longitudinal frame member and a transverse portion secured to the transverse frame member.

7. The truck chassis of claim 5 further characterized in that each said bracket means comprises a pair of said angle members.

8. The truck chassis of claim 6 further characterized in that each said bracket means comprises a pair of said angle members.

9. The truck chassis of claim 1 further comprising means for securing said bracket means to said longitudinal frame members said securing means being positioned entirely on the outer face of each of said longitudinal frame members.

* * * * *